(12) United States Patent
Hanson et al.

(10) Patent No.: US 11,556,510 B1
(45) Date of Patent: Jan. 17, 2023

(54) SYSTEM AND METHOD FOR ENRICHING AND NORMALIZING DATA

(71) Applicant: KPMG LLP, New York, NY (US)

(72) Inventors: Niels Hanson, Seattle, WA (US); James Johnson Gardner, Rolling Hills Estates, CA (US); Punit S. Orpe, Mahwah, NJ (US); Wendy Du, Anaheim, CA (US); Laurence Anthony Brown, Dallas, TX (US); Ranjan Vivek Mannige, Atlanta, GA (US); David Green, Evanston, IL (US); Michael Ahn, Burke, VA (US); Yang Zhou, Dallas, TX (US); Andrew Yuan, New York, NY (US); Adam Helio Rosa, Longmont, CO (US); Kyle B. Chen, Chicago, IL (US); Alex Perusse, Seattle, WA (US); Christian Alexander Manaog, Rego Park, NY (US); Yeshwanth Somu, Arlington, VA (US); Xin Cheng, Seattle, WA (US); Torey C. Bearly, Renton, WA (US); Raghav Saboo, New York, NY (US); Sphoorthy Pamaraju, Secaucus, NJ (US); Erik Ernst, Denver, CO (US); Can Ozuretmen, Atlanta, GA (US); Yuan Zhang, Cincinnati, OH (US)

(73) Assignee: KPMG LLP, New York, NY (US)

( * ) Notice: Subject to any disclaimer, the term of this patent is extended or adjusted under 35 U.S.C. 154(b) by 0 days.

(21) Appl. No.: 17/675,192

(22) Filed: Feb. 18, 2022

(51) Int. Cl.
    *G06F 16/215* (2019.01)
    *G06F 16/23* (2019.01)
    *G06F 16/25* (2019.01)

(52) U.S. Cl.
    CPC ........ *G06F 16/215* (2019.01); *G06F 16/2379* (2019.01); *G06F 16/254* (2019.01)

(58) Field of Classification Search
    USPC ....................................................... 707/602
    See application file for complete search history.

(56) References Cited

U.S. PATENT DOCUMENTS

| | | | | |
|---|---|---|---|---|
| 10,438,133 B2* | 10/2019 | Vachhani | ............... | G06N 20/00 |
| 2003/0191832 A1* | 10/2003 | Satyavolu | ............. | G06F 16/958 |
| | | | | 707/E17.032 |
| 2004/0078423 A1* | 4/2004 | Satyavolu | ............. | G06Q 10/10 |
| | | | | 715/234 |

(Continued)

*Primary Examiner* — Cam Linh T Nguyen
(74) *Attorney, Agent, or Firm* — Nelson Mullins Riley & Scarborough LLP; Anthony A. Laurentano

(57) ABSTRACT

An integrated platform system that employ a series of machine learning techniques and prediction and detection units that can process input data and extract and generate meaningful insights and predictions therefrom. The system integrates together multiple different data storage types and applications that generates data of different types, and an associated processing system for processing the different data types, store the data in a common data model to normalize the data, determine the data lineage of the data, and then process the data using different types of techniques. The data can also be processed by a prediction unit for generating meaningful insights and predictions or by an anomaly detection unit for detecting one or more anomalies in the data.

22 Claims, 11 Drawing Sheets

(56) References Cited

U.S. PATENT DOCUMENTS

| | | | | |
|---|---|---|---|---|
| 2013/0024440 A1* | 1/2013 | Dimassimo | ............ | G06F 16/248 |
| | | | | 707/706 |
| 2013/0144605 A1* | 6/2013 | Brager | .................... | G06F 40/40 |
| | | | | 704/9 |
| 2014/0250052 A1* | 9/2014 | Lospinoso | ............. | G06N 5/048 |
| | | | | 706/59 |
| 2015/0095303 A1* | 4/2015 | Sonmez | ................. | G06N 5/003 |
| | | | | 707/707 |
| 2016/0125085 A1* | 5/2016 | Vasudevan | .......... | G06F 16/9535 |
| | | | | 707/734 |
| 2018/0101533 A1* | 4/2018 | Robichaud | ............. | G06Q 10/10 |
| 2019/0188584 A1* | 6/2019 | Rao | ........................ | G06N 20/00 |
| 2021/0342920 A1* | 11/2021 | Keck | ................... | G06F 16/9535 |
| 2022/0050838 A1* | 2/2022 | Piatetsky | ............ | G06F 16/2455 |

\* cited by examiner

SYSTEM AND METHOD FOR ENRICHING AND NORMALIZING DATA

BACKGROUND OF THE INVENTION

The present invention is directed to data aggregation and enrichment systems, and in particular is directed to systems and methods for aggregating, enriching and normalizing data.

Today, enterprises, such as companies, generate vast amounts of data during their normal business operations. The generated data typically includes many different types of data, including for example financial data, human resource data, customer-related data, environmental data, and the like. The generation of the vast amounts of data makes it challenging for companies to properly and efficiently capture, aggregate and organize the data so that the data can be later used in meaningful ways. Further, the generated data is typically stored in disparate systems across many different servers, which can be at physically remote locations. The data can be stored, for example, in different types of databases having different inherent structures for different purposes or applications. As such, the data when extracted from the different database types is inherently incompatible with each other.

Traditional methodologies exist for trying to reconcile the different types of data extracted from the different database types. These methods include the brute force creation of specific software configured for translating the different types of data so as to be compatible with one or more different types of databases. A drawback of these types of methods includes the extensive resources and expertise that are required to create the software to translate the data. As such, enterprises inherently do not perform these types of activities except in limited situations because of the costs associated with this endeavor.

Other conventional methodologies include the use of common data models for creating and placing the data into a more uniform structure that has a defined set of attributes and entities. A drawback of this approach is that most databases do not employ common data models. Further, the meager few that do exist oftentimes do not employ a proper and complete set of identities and attributes that are needed for specific data generated by the enterprise. As such, the common data models themselves oftentimes require a relatively detailed degree of customization, which requires a high level of expertise and is hence resource intensive.

SUMMARY OF THE INVENTION

The data aggregation and normalization system of the present invention enables a user to provide a data development and hosting platform in a cloud-native environment. The system of the invention can also employ a series of machine learning techniques (e.g., accelerators) and/or prediction and detection units that can process the data and extract and generate meaningful insights and predictions therefrom. The integrated platform provided by the system of the present invention allows the user to integrate together in a connected system multiple different data storage types and applications that generates data of different types, and an associated processing system that can process the different types of data, store the data in a common data model so as to normalize the data, determine the data lineage of the data, and then process the data using different types of techniques. For example, the cleaned and normalized data can be processed by one or more machine language techniques. Alternatively, the data can be processed by a prediction unit for generating meaningful insights and predictions or by an anomaly detection unit for detecting one or more anomalies in the data.

The present invention is directed to a data aggregation and normalization system for aggregating data from disparate data sources, processing the data to clean the data and to normalize or standardize the data using one or more common data models, and then applying one or more discrete machine learning techniques or prediction units to the normalized data to provide data insights and predictions. The normalized data can also be processed by one or more reporting modules to provide one or more customized reports.

The present invention is directed to a data aggregation and normalization system for enriching and normalizing data, comprising a plurality of data sources for providing data that is generated by a plurality of different types of data systems that are managed by different types of software applications, a data extraction unit for extracting selected portions of the data from the plurality of data sources to form extracted data, a data storage unit for storing the extracted data, and a data preprocessing and enrichment unit for processing and enriching the extracted data to form cleaned data that is stored in the data storage unit. The data preprocessing and enrichment unit can include a data cleaning unit for cleaning the extracted unit to form cleaned data, a common data model unit for inserting the cleaned data into a common data model to normalize the cleaned data, an assessment unit for assessing a quality of the cleaned data in the common data model, and a data lineage unit for determining a lineage of selected portions of the cleaned data. The system can also include a machine language module having a plurality of predefined machine learning units for applying one or more selected artificial intelligence and machine learning (AI/ML) techniques to selected portions of the cleaned data to form machine language data, a transformation unit for transforming the machine language data into a selected reporting format, and a reporting unit for generating one or more reports from the data in the reporting format.

The system of the present invention can also include a data feedback loop for reintroducing to one or more of the plurality of data sources the transformed data for subsequent processing by the data preprocessing and enrichment unit.

The data extraction unit can be configured to copy the data from the data sources, transform the copied data by converting the data into a selected format, and load the data in the data storage unit. The data lineage unit can apply a plurality of business rules to the cleaned data.

The cleaned data can include transaction data, product data, and user data, and the machine language module can further include a prediction unit for processing the transaction data and the user data and generating a prediction based on an interest in one or more selected products of a selected user. According to the present invention, the prediction unit can include a filter unit for processing the transaction data and the user data and for generating a product interest score indicative of the interest in the one or more selected products by the selected user.

The filter unit of the present invention can include a pattern filter unit for identifying from the transactional data a set of users having similar product preferences to the selected user and for generating based thereon a first product interest score indicative of a first interest level in the product by the selected user; a neuro pattern filter unit for identifying from the transactional data and the user data a set of users having similar product preferences to the selected user and for generating based thereon a second product interest score indicative of a second interest level in the product by the selected user, a page rank unit for processing the product data and the user data and for generating therefrom a community interest score associated with the one or more selected products; a user feature extraction unit for processing the user data and for identifying and extracting one or more primary user features based on the user data having a user feature score associated therewith; a product feature extraction unit for processing the product data and for identifying and extracting one or more primary product features based on the product data having a product feature score associated therewith; a scoring unit for receiving and processing the first product interest score, the second product interest score, the community interest score, the user feature score, and the product feature score to determine therefrom a final product score indicative of the user interest in the one or more selected products; and a ranking unit for ranking the final product interest scores.

The community interest score generated by the page rank unit is based on a number of web links directed to one or more web pages listing the one or more selected products, and the user feature extraction unit employs a principal component analysis technique to determine the one or more primary user features. The product feature extraction unit employs a principal component analysis technique to determine the one or more primary product features.

According to the present invention, the machine language module can further include an anomaly detection unit for detecting one or more anomalies in the cleaned data. The anomaly detection unit can include a segmentation unit for segmenting the cleaned data into a plurality of data segments; an entropy determination unit for determining entropy values for each of the plurality of data segments and for determining a plurality of distributions of the entropy values; an entropy change determination unit for comparing each of the plurality of distributions of the entropy values with each of the remaining ones of the plurality of distributions of the entropy values and for determining therefrom a change in the entropy value of each of the plurality of data segments relative to each other to form a plurality of distributions of entropy change values; an entropy selection unit for analyzing and selecting one or more distributions of entropy change values that trend in an upward direction, wherein the entropy change values correspond to one or more anomalies; and a removal unit for identifying selected ones of the plurality of distributions of entropy change values that are identical to each other, clustering together the identical ones of the plurality of distributions of entropy change values, and then removing duplicates of the identical ones of the plurality of distributions of entropy change values. Further, the segmented data is arranged in a hierarchical manner and the change in the entropy value can be determined by employing a K-L divergence technique.

The present invention is also directed to a method for enriching and normalizing data from a plurality of different types of data systems that are managed by different types of software applications, comprising extracting with a data extraction unit selected portions of data from a plurality of data sources to form extracted data, wherein the plurality of data sources provides data that is generated by a plurality of different types of data systems that are managed by different types of software applications, storing the extracted data in a data storage unit, and processing and enriching the extracted data with a data preprocessing and enrichment unit to form cleaned data that is stored in the data storage unit. The processing and enriching of the cleaned data includes cleaning the extracted unit with a data cleaning unit to form cleaned data, inserting the cleaned data into a common data model to normalize the cleaned data, assessing a quality of the cleaned data in the common data model, and determining with a data lineage unit a lineage of selected portions of the cleaned data. The method of the present invention also includes applying one or more selected artificial intelligence and machine learning (AI/ML) techniques to selected portions of the cleaned data to form machine language data, wherein the one or more selected artificial intelligence and machine learning (AI/ML) techniques is stored in a machine language module having a plurality of predefined machine learning units, transforming the machine language data into a selected reporting format, and generating with a reporting unit one or more reports from the data in the reporting format. The data extraction unit is configured to copy the data from the data sources, transform the copied data by converting the data into a selected format, and load the data in the data storage unit.

The method also includes applying a plurality of business rules to the cleaned data with the data lineage unit and reintroducing to one or more of the plurality of data sources the transformed data for subsequent processing by the data preprocessing and enrichment unit with a data feedback loop.

The cleaned data can include transaction data, product data, and user data, and the machine language module can further include a prediction unit for processing the transaction data and the user data and generating a prediction based on an interest in one or more selected products of a selected user. The prediction unit can filter with a filter unit the transaction data and the user data and generating a product interest score indicative of the interest in the one or more selected products by the selected user. The filter unit can also be configured for identifying from the transactional data a set of users having similar product preferences to the selected user and generating based thereon a first product interest score indicative of a first interest level in the product by the selected user with a pattern filter unit, and identifying from the transactional data and the user data a set of users having similar product preferences to the selected user and generating based thereon a second product interest score indicative of a second interest level in the product by the selected user with a neuro pattern filter unit. The prediction unit can further include processing with a page rank unit the product data and the user data and generating therefrom a community interest score associated with the one or more selected products, processing with a user feature extraction unit the user data and identifying and extracting one or more primary user features based on the user data having a user feature score associated therewith, processing with a product feature extraction unit the product data and identifying and extracting one or more primary product features based on the product data having a product feature score associated therewith, processing with a scoring unit the first product interest score, the second product interest score, the community interest score, the user feature score, and the product feature score to determine therefrom a final product score indicative of the user interest in the one or more selected products, and ranking the final product interest scores.

The community interest score generated by the page rank unit is based on a number of web links directed to one or more web pages listing the one or more selected products, and the user feature extraction unit employs a principal component analysis technique to determine one or more primary user features. The product feature extraction unit employs a principal component analysis technique to determine the one or more primary product features.

According to the method of the present invention, the machine language module further comprises an anomaly detection unit for detecting one or more anomalies in the cleaned data. The anomaly detection unit can be configured to segment the cleaned data into a plurality of data segments; determine with an entropy determination unit entropy values for each of the plurality of data segments and for determining a plurality of distributions of the entropy values; compare with an entropy change determination unit each of the plurality of distributions of the entropy values with each of the remaining ones of the plurality of distributions of the entropy values and determine therefrom a change in the entropy value of each of the plurality of data segments relative to each other to form a plurality of distributions of entropy change values; select with an entropy selection unit one or more distributions of entropy change values that trend in an upward direction, wherein the entropy change values correspond to one or more anomalies; identify selected ones of the plurality of distributions of entropy change values that are identical to each other; cluster together the identical ones of the plurality of distributions of entropy change values; and then remove duplicates of the identical ones of the plurality of distributions of entropy change values.

BRIEF DESCRIPTION OF THE DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

DETAILED DESCRIPTION

The present invention is directed to a data aggregation and normalization system for aggregating data from disparate data sources, processing the data to clean the data and to normalize or standardize the data using one or more data models, and then applying one or more discrete machine learning techniques to the normalized data to provide meaningful data insights and predictions. The normalized data can also be processed by one or more reporting modules to provide one or more customized reports to an end user.

As used herein the term "financial data" can include any data that is associated with or contains financial or financial related information. The financial information can include structured and unstructured data, such as information that is presented free form or in tabular formats, and is related to data associated with financial, monetary, or pecuniary interests. The financial data can oftentimes reside in or be extracted from enterprise resource planning (ERP) systems that are designed to aggregate financial as well as other types of data.

As used herein, the term "non-financial data" is intended to include data that is not financial in nature, and can include, for example, environmental related data, user related data, customer-related data, content related data, product related data, supply chain related data, workflow related data, operations related data, reporting related data, manufacturing related data, human resource related data, internet related data including social media information or other publicly available datasets (e.g., census, public government report data), and the like.

As used herein, the term "enterprise" is intended to include a structure or collection of structures (e.g., buildings), facility, business, company, operation, organization, country, or entity of any size. Further, the term is intended to include an individual or group of individuals, or a device of any type.

As used herein, the term "financial unit, "financial subsystem," "financial system" or "financial infrastructure" is intended to include any unit implemented in hardware, software or a combination thereof that applies financial rules and models to data of any type, including financial data and environmental data, so as generate one or more financial reports. The financial rules and modeling can include applying known and/or custom business concepts, accounting concepts, tax concepts, audit concepts, consulting concepts or advisory concepts.

As used herein, the term "financial reports" is intended to include any statement or report that exists in any suitable format (e.g., printed or in digital file format) that sets forth or includes financial data, including, for example, tax returns, income statements, cash flow statements, balance sheets, 10-K statements, 10-Q statements, audit reports, annual reports, loan applications, credit history reports, invoices, and the like.

Figure 1:
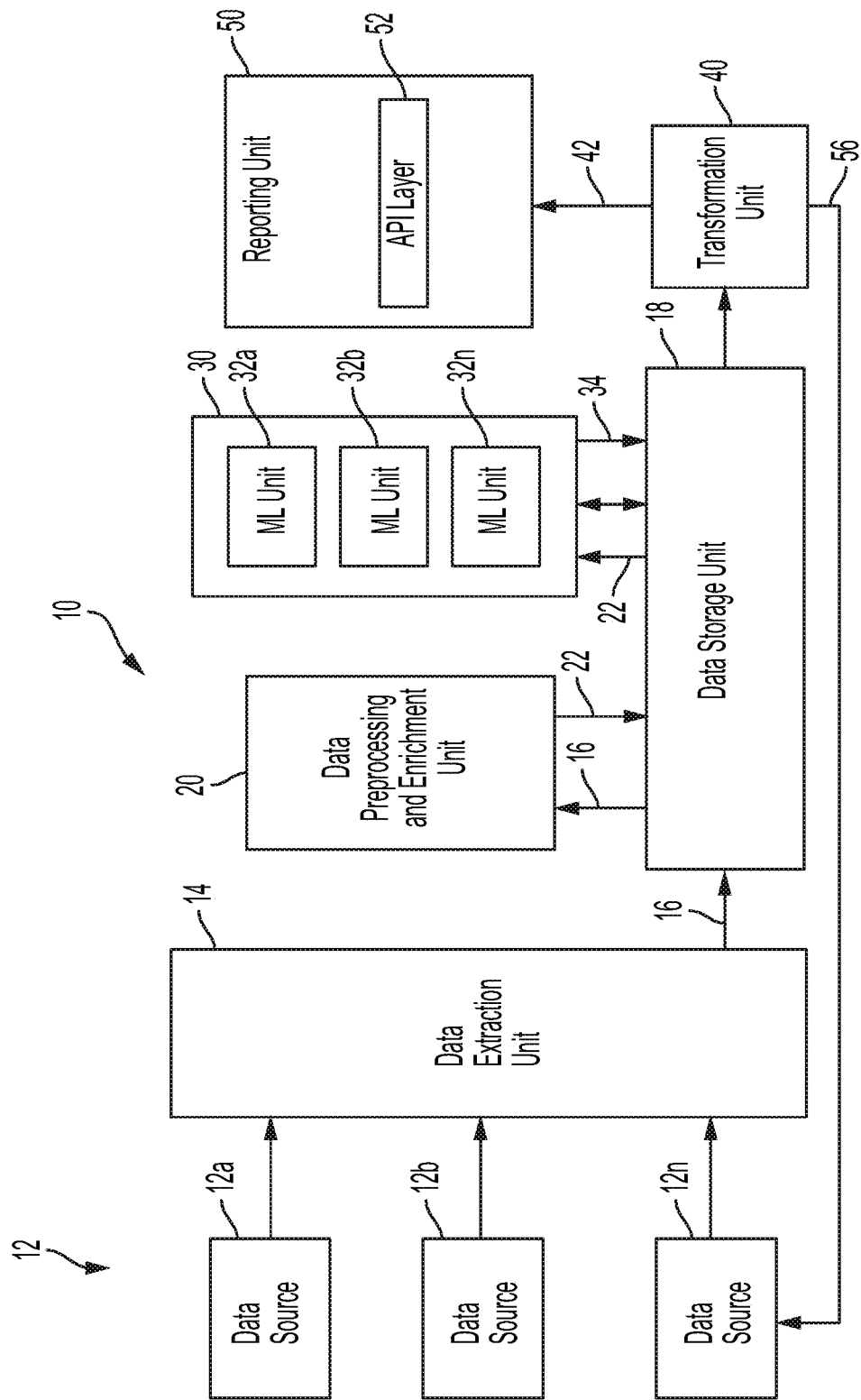
FIG. 1 is a schematic block diagram illustration of a data aggregation and normalization system according to the teachings of the present invention.

FIG. 1 is directed to a data aggregation and normalization system for collecting, collating or aggregating data, such as for example financial and non-financial data, from a variety of different data sources, and then cleaning and enriching the data for subsequent use in a variety of different ways. As shown, the data aggregation and normalization system 10 can include a plurality of data sources 12, and specifically data sources 12a-12n that are sources of data to be processed by the system 10 of the present invention. According to one example, the data sources 12 can include data from data records generated and stored in a number of different systems that are managed by different types of software applications, including for example software applications from Oracle, Salesforce, and the like. The data acquired by the data sources 12a-12n can be conveyed through any suitable data connection, such as via a network, to a data extraction unit 14. The illustrated data extraction unit 14 can extract, transform and load (ETL) the extracted data 16 into a data storage unit 18. Specifically, the data extraction unit 14 is configured to copy the data from the data sources 12, transform the data by converting the file or format structure of the source data into another usable form or suitable format, and then load the data in the data storage unit 18. The data extraction unit 14 thus serves as one or more extract, transform and load (ETL) data pipelines between the data sources 12 and the data storage unit 18. Examples of a suitable ETL software application or system that can be employed to extract and load the data from the data sources 12 includes the ETL software platform from Informatica, USA. The data storage unit 16 can be configured to store the extracted data 16 in any suitable form or format. The data storage unit 18 can be in essence a data lake or a data warehouse. As such, the data storage unit 18 can be configured to store the extracted data in a raw data format, usually as object blobs or files. The data storage unit 18 can also be configured to store processed data in addition to the raw data. The data storage unit 18 can be constructed as a single data store for storing raw and processed data that can be subsequently used for tasks such as reporting, visualization, advanced analytics, machine learning, and the like. The data storage unit 18 can employ, according to one practice, multiple different data buckets that provides a place to store extracted data (e.g., raw data), a place to store cleaned data, provides a workspace for AI/ML modeling processing and a storage area for machine language models, prediction units, and data associated therewith or generated thereby (e.g., trusted data). The data storage unit 18 can include structured data from relational databases (e.g., rows and columns), semi-structured data (e.g., CSV, logs, XML, JSON), unstructured data (e.g., emails, documents, PDFs), and binary data (e.g., images, audio, video). The data storage unit 18 can be implemented in hardware and software on premises (i.e., within the data centers of an enterprise), distributed between multiple different locations or premises, or can be hosted in the cloud using known cloud hosting services from vendors such as Amazon, Microsoft, Amazon, Google, and the like.

Figure 2:
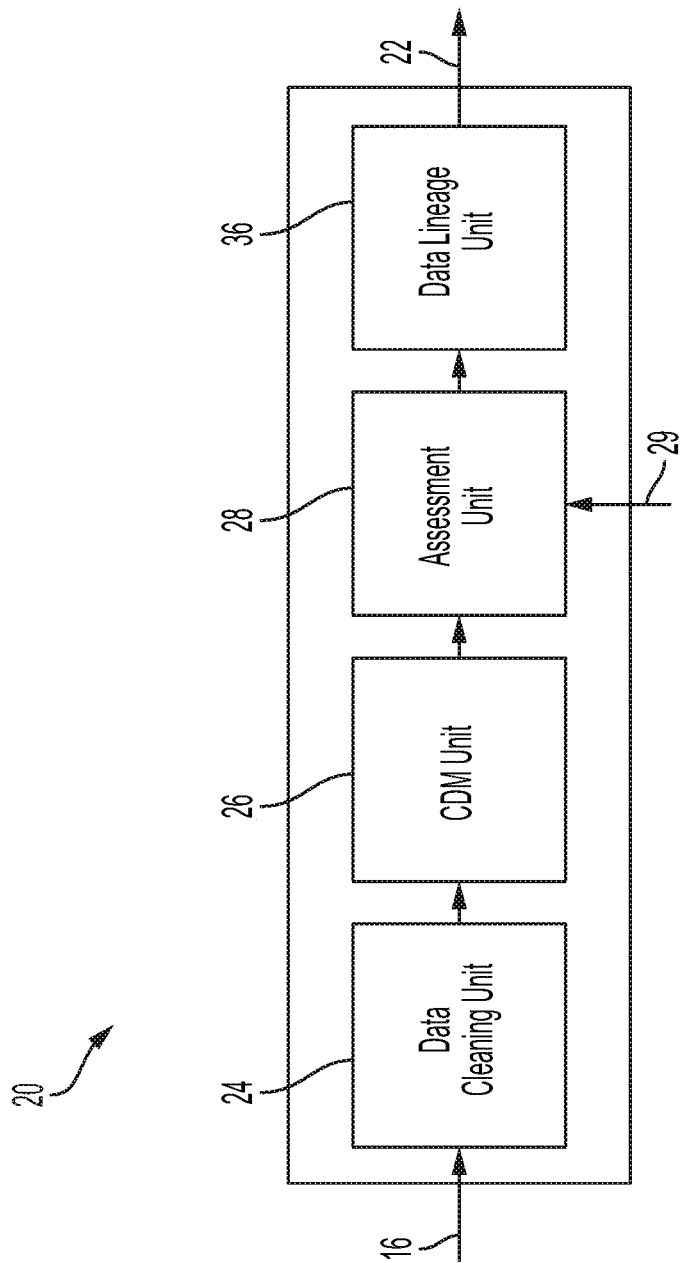
FIG. 2 is a schematic block diagram illustrating the processing components of the data preprocessing and enrichment unit of the data aggregation and normalization system of FIG. 1 according to the teachings of the present invention.

The illustrated data storage unit 18 can communicate with a data preprocessing and enrichment unit 20 for preprocessing and enriching the data for subsequent use by the data aggregation and normalization system 10. As used herein, the term "enrich," "enriching," or "enriched" is intended to include the ability to ingest and integrate data, and then apply logic and structure to the data so as to curate, correct and/or clean the data. Specifically, the data preprocessing and enrichment unit 20 can be configured to pull the extracted data stored in the data storage unit 18 and then perform a series of preprocessing and enrichment operations on the data. As shown for example in FIG. 2, the data preprocessing and enrichment unit 20 can include a data cleaning unit 24 for initially cleaning selected portions of the extracted data stored in the data storage unit 20. As used herein, the terms "data cleaning," "cleaning," and "clean" include the process of detecting and correcting or removing corrupt, inaccurate, or duplicate records from data, such as for example from a record set, table, or database by identifying incomplete, incorrect, inaccurate or irrelevant parts of the data and then replacing, modifying, or deleting the raw, dirty or coarse data. Once the data is cleaned by the data preprocessing and enrichment unit 20, the cleaned data 22 is consistent with other similar data or data sets in the system 10. The inconsistencies detected or removed by the data cleaning unit 24 may have been originally caused by user entry errors, by corruption in transmission or storage, or by different data dictionary definitions of similar entities located in different data stores.

The cleaned data generated by the data cleaning unit 24 can also be used as data to populate a common data model to provide a comprehensive data framework and common interface for the preprocessed data. For example, the data preprocessing unit 20 can further include a common data module (CDM) generation unit 26 for generating or storing a common data model that incorporates or includes the cleaned data received from the data cleaning unit 24. The common data model can serve to conform, organize, and normalize elements of data and standardize or normalize how the data elements relate to one another and to the properties of real-world entities. As is known, data models can include a set of standardized, extensible data schemas that employ a defined set of data entities, data attributes, relationships, and semantic metadata (i.e., traits). The data entity can describe the structural shape and semantic meaning for records of the data. The entities can thus represent physical objects, locations, interactions, individuals, point-in-time measurements, data types, and the like. The entity can also describe the meaning and shape of the data through a set of attributes, which can include an atomic or simple attribute type and a more complex, composite attribute type. The common data model allows downstream applications to be able to use the data stored therein by providing a common, normalized, standardized, and shared data language for the applications to use. The common data model of the present invention can utilize the entities in the Microsoft common data model, and can further include entities such as order lines and suppliers and ledger code combinations. Further, the entities in the Microsoft common data model can be further enhanced to include additional attributes, such as the Account, Product, Company, Invoice, order, Order product, Customer Journey, Lead, Contact, Event, User, Case, Task, Contract, ledger, Journal Header and Line, and Sales Invoice entities.

The data preprocessing and enrichment unit 20 can also employ an assessment unit 28 for assessing the data quality of the cleaned data in the common data model by determining or identifying the data that is anomalous. This can be performed by analyzing historical data and then detecting discrepancies, or can employ if desired data from third party data sources 29 that can be employed to detect anomalies in the cleaned data. The historical data can be employed to construct a series of correlated rules and then using the number of rules flagged, or lack of rules flagged, to determine anomalous, error containing, or net-new data types (e.g., a new kind of financial report). As used herein, the term "anomalies" or anomaly" is intended to mean inconsistencies, redundancies, or errors in the cleaned data. The anomalies can be naturally occurring and can result in data that does not match the real-world the data source or database purports to represent. The anomalies can include for example update anomalies, insertion anomalies, deletion anomalies, and the like. Further, as used herein, the term "quality" or "data quality" is intended to mean data that is fit for its intended use in operations, decision making, planning, and the like, and correctly represents the real-world construct to which the data refers.

Figure 3:
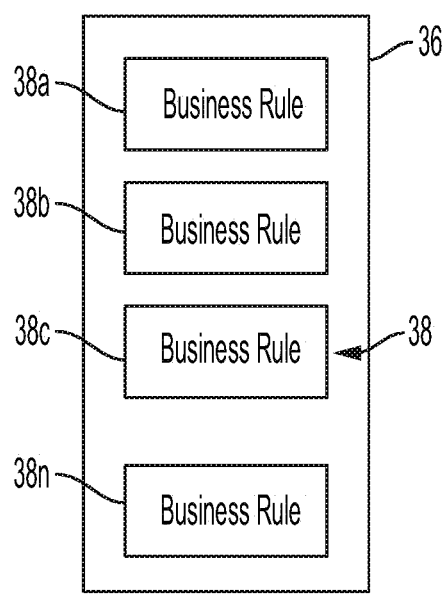
FIG. 3 is a schematic block diagram illustrating the processing components of the data lineage unit of the data preprocessing and enrichment unit of FIG. 2 according to the teachings of the present invention.

The data preprocessing and enrichment unit 20 can also employ a data lineage unit 36 for determining the lineage of selected cleaned data. The illustrated data lineage unit 36 is shown for example in FIGS. 2 and 3. The data lineage unit 36 can determine the source of the data and the lineage or path that the data follows or flows when processed by the data aggregation and normalization system 10. The data lineage unit 36 can be configured to generate a data lineage map or graph or the like to represent or illustrate the flow of data in the system. The data lineage unit 36 can also be configured to employ one or more business rules 38, illustrated as business rules 38a-38n, for applying selected different business rules to the cleaned data. The term "business rule" as used herein is intended to mean a particular predefined manner or way in which a software application performs, processes or treats data, and which has a business connotation. While business rules are generally conceptual in nature, in a software application they are usually implemented by some fragments or snippets of source code, which enforce the validations or execute the associated calculations. According to one practice, the data can be employed by any selected combination of business rules so as to process the data in a predefined manner and according to a predefined technique. Business rules modify the raw data to prepare the data for later applications by both updating exiting data and calculating new data based on the predefined business rules. The cleaned and enriched data can then be stored in the data storage unit 18.

The illustrated data aggregation and normalization system 10 can also employ a machine language module 30 that employs a set of predefined machine learning units 32a-32n for applying one or more selected artificial intelligence and machine learning (AI/ML) models or techniques to selected portions of the cleaned data 22. The machine language module 30 can also employ one or more separate prediction units for generating predictions and/or insights from the cleaned and enriched data. The machine learning techniques can be custom or commonly available artificial intelligence and machine learning methodologies (e.g., computer science algorithms) that have been proven to work with large volumes of data and are able to capture and identify intricate or detailed patterns in the data. The present invention can optionally allow the users to preselect the machine learning methodology applied to the cleaned data prior to application of the data. The machine learning techniques employed by the machine learning units 32a-32n can include, for example, a supervised learning technique (e.g., regression or classified techniques), an unsupervised learning technique (e.g., mining techniques, clustering techniques, and recommendation system techniques), a semi-supervised technique, a self-learning technique, or a reinforcement learning technique. Examples of suitable machine language techniques include Random Forest, neural network, clustering, XGBoost, bootstrap XGBoost, Deep learning Neural Nets, Decision Trees, regression Trees, and the like. The machine learning algorithms may also extend from the use of a single algorithm to the use of a combination of algorithms (e.g., ensemble methodology) and may use some of the existing methods of boosting the algorithmic learning, bagging of results to enhance learning, incorporate stochastic and deterministic approaches, and the like, to ensure that the machine learning is comprehensive and complete. The machine learning units 32a-32n can generate insights and predictions that can be stored in the data storage unit 18. According to one practice, AI/ML models or techniques can be packaged within containerized API applications, which can be deployed at scale, for example, within a Kubernetes-based environment. The machine language data 34 generated by the machine language module 30 can be stored in the data storage unit 18 as trusted data since it has a relatively high fidelity.

The data aggregation and normalization system 10 can also employ a transformation unit 40 for transforming the trusted data (e.g., the machine language data) into transformed data 42 having a format suitable for use by the reporting unit 50 via an application programming interface (API) layer 52. For example, when the trained machine language models are stored in the data storage unit 18, the transformation unit 40 can convert and update the configurations of the trained models for use by the reporting unit 50. Alternatively, if the machine language data includes results from one or more of the machine language units or includes a series of predictions or insights (e.g., in json or tabular parquet format), the transformation unit 40 can transform or update the relevant tables in the API database layer 52. This update result is then reflected in microservices or applications that pull data from the table.

Further, the illustrated system 10 an employ a data feedback loop 56 for reintegrating or reintroducing to one or more of the data sources the transformed data for subsequent processing by the data preprocessing and enrichment unit 20. Furthermore, the AI/ML model results, predictions and insights can be fed back into the relevant data pipelines, such as for example into the data sources 12a-12n. This technique allows enriched data and AI/ML model results to be leveraged by additional models and to be integrated within data source systems.

The reporting unit 50 can include an application programming interface for enabling selected reporting software applications to interface with the transformed data. The reporting software applications can include any selected commercially available or custom reporting applications that generate selected user interfaces for reporting and displaying selected information.

Figure 4:
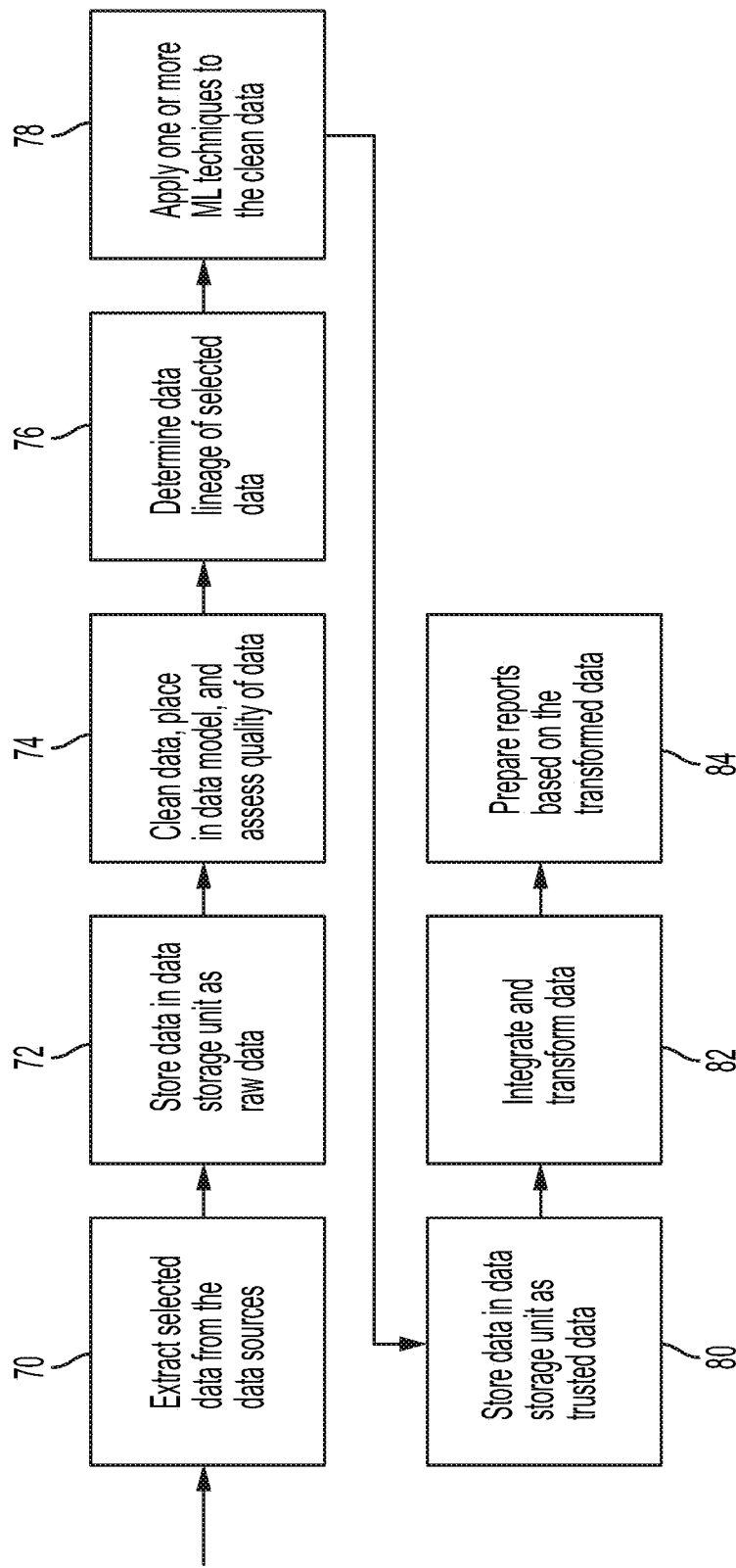
FIG. 4 is a schematic flow chart diagram illustrating the method of forming normalized data by the data aggregation and normalization system of FIG. 1 according to the teachings of the present invention.

In operation, as shown for example in FIG. 4, the data extraction unit 14 pulls or extracts selected data from the data sources 12a-12n, step 70. For example, the data aggregation and normalization system 10 can employ a Microsoft Azure Data Factory software platform that employs extract, transform, and load (ETL) software to form data driven workflows (e.g., pipelines) that helps extract and integrate selected data records from the data sources, transform the data using for example compute services such as HDInsight Hadoop, Spark, Data Lake Analytics, or Machine Learning, and then loading or publishing the data. Alternatively, the system 10 can employ other types of ETL software or platforms, such as for example the software platform from Informatica, USA. The extracted data 16, which is in essence raw data, can be stored in the data storage unit 18, step 72. The data storage unit 18 can include multiple storage units that can be located in a single location or can be dispersed throughout a network. Further, the data storage unit 18 can also include remote storage resources that are cloud hosted by one or more cloud storage providers, such as for example Microsoft, Amazon Web Services, Google, and the like. According to one practice, the data storage unit 18 can employ binary large object (BLOB) storage that is in essence binary data stored as a single entity. In Microsoft Azure, the blob storage can employ multiple containers or buckets that store blob type data. In the current embodiment, the data storage unit 18, if implementing blob type storage, can store the raw data in a raw blob data container or bucket.

The data aggregation and normalization system 10 of the present invention can employ a data preprocessing and enrichment unit 20 for preprocessing the extracted raw data to form cleaned data 22, step 74. The cleaned data 22 can also be stored in the data storage unit 18. The data preprocessing and enrichment unit 20 can be constructed in any selected manner to form the cleaned data 22. According to one embodiment, the data preprocessing and enrichment unit 20 can employ a data cleaning unit 24 for cleaning the extracted data. The data preprocessing and enrichment unit 20 can also employ a common data model (CDM) unit 26 for mapping or placing the data in a common data model. The common data model can have a set of defined attributes and entities for organizing the data in a standardized data format. The data in the common data model can then be processed by an assessment unit 28 for assessing the quality of the data. As used herein, "data quality" or "quality of data" is intended to mean a measure of the condition of data based on a series of factors, which can include for example accuracy, completeness, reliability, consistency, timeliness, and/or accessibility of the data. The data from the assessment unit 28 can then be processed by a data lineage unit 36 for determining and then displaying a data lineage map or graph of selected data, step 76. The data lineage unit 36 can also apply or overlay one or more business rules to the data. The cleaned data 22 can then be stored in the data storage unit 14 in, for example, a cleaned blob data bucket.

The cleaned data 22 can then be processed or consumed by a machine language module 30 that employs one or more machine language units 32a-32n. The machine language units can process the cleaned data using one or more pre-stored, predefined and trained machine language techniques for generating insights, predictions, machine language models, and the like, so as to form machine language or trusted data 34, step 78. Specifically, selected ones of the entities representative of selected portions of the cleaned data can be processed or consumed by selected ones of the machine language units. As the machine language module 30 processes the cleaned data, the module 30 can store the intermediate processing results in the data storage unit 18. The machine language data 34, when generated, can then be stored in the storage unit 18 as machine language or trusted data 34, step 80. According to one practice, the machine language data 34 and the intermediate results can be stored in separate and distinct blob data buckets. According to one practice, the data storage unit can function as a data lake with multiple different data buckets providing a place to land or store the extracted data, the cleaned data, the intermediate results, and the trusted or machine language data.

The illustrated data aggregation and normalization system can also employ a transformation unit for transforming the machine language data into a format that is suitable for use by one or more applications employed by the reporting unit 50, step 82. The transformation unit can transform the data using suitable techniques, such as for example by using a data mapping technique. Data mapping is the process of matching data fields or elements from a data source, such as the machine language data, to related data fields at a destination, such as one or more applications in the reporting unit 50. The data mapping technique allows the system to establish relationships between data models that are in different sources or systems. According to another practice, the transformation unit 40 can implement one or more data pathways or pipelines for transforming and exchanging data between the data storage unit 18 and the reporting unit 50. According to one embodiment, the data pathways can include a pathway for conveying data about the trained ML models in the form of serialized binary-files to as to update configurations of one or more applications in the reporting unit 50 that employ the ML model data. Alternatively, if the machine language data includes insights and predictions, which can be represented as data objects in Java Script Object Notation (JSON) or in tabular parquet format, then the transformation unit 40 can update the relevant tables in one or more applications in the reporting unit 50. Further, the transformation unit 50 can update or feed back into the relevant data sources the machine language data as application enhancements employing another data pathway or loop 56.

The transformed data 42 can then be conveyed to one or more reporting or visual representation software applications stored in or which form part of the reporting unit 50 via the API layer 52. The API layer 52 allows the transformed data and other system software applications to communicate with the applications of the reporting unit, as well as with external third party applications. The reporting unit 50 can employ one or more reporting applications that can be configured for generating one or more reports, including financial reports, based on the transformed data, step 86. Further, a system user can interface with the reporting unit 50 so as to construct a selected report.

The data aggregation and normalization system employs the illustrated units and modules to form a complete, efficient, and robust data normalization unit for automatically extracting, cleaning, and normalizing data for subsequent use by a reporting unit. The selected combination of units, including the data extraction unit and the data preprocessing and enrichment unit, provide for specific synergies and efficiencies when processing and enriching the data. For example, the system cleans the extracted data and then normalizes the data by loading or storing in a common data model. The data once in the model can be examined or processed for quality by the assessment unit to ensure that the data is in proper form. The data lineage unit can then determine a lineage or flow path of selected portions of the cleaned data through the system 10. This approach automates selected tasks when developing data pipelines and leverages highly scalable and performant technologies which meet the demands of large datasets.

Figure 5:
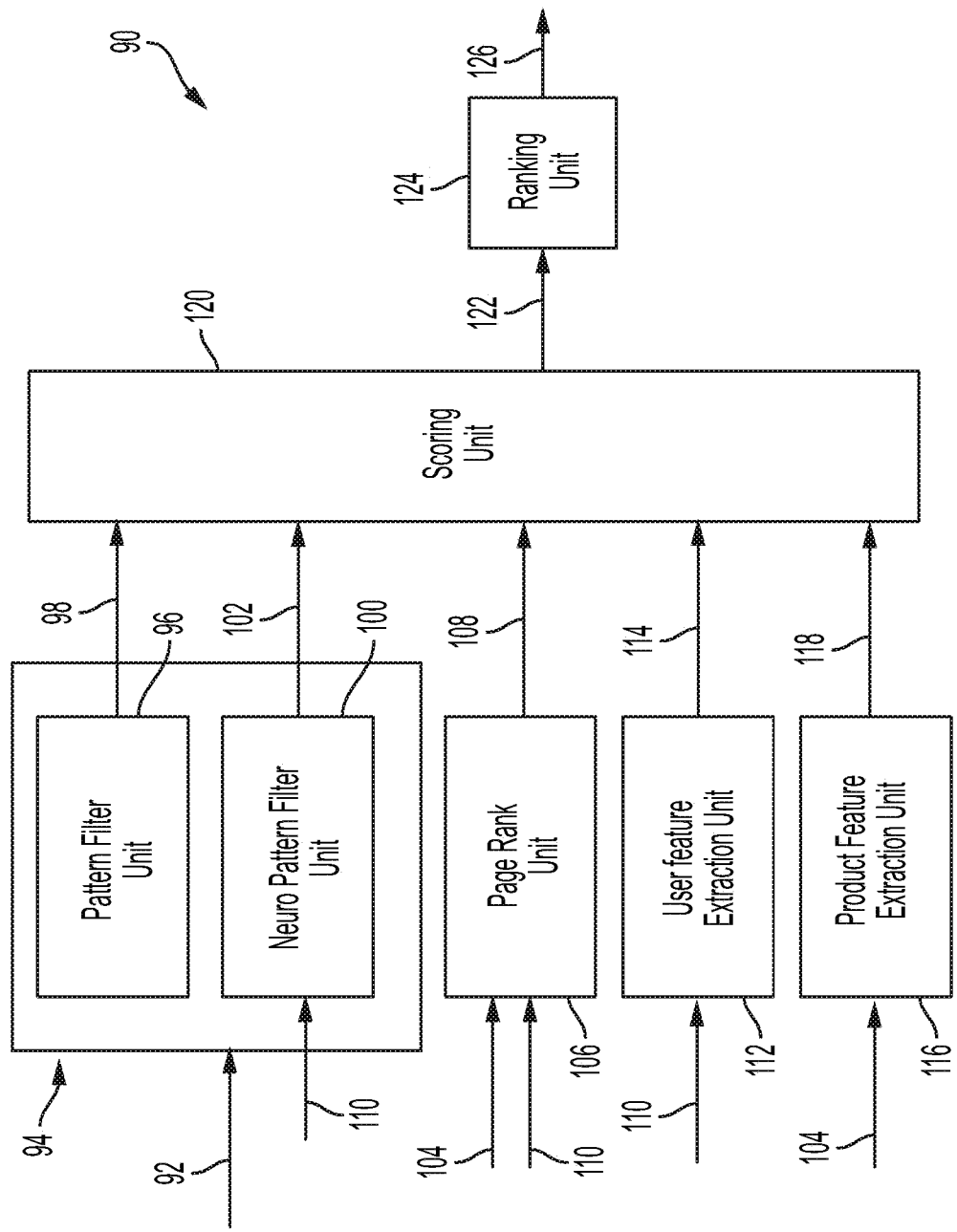
FIG. 5 is a schematic block diagram showing the elements of a prediction unit that forms part of the data aggregation and normalization system according to the teachings of the present invention.

The machine language module 30 of the data aggregation and normalization system 10 of the present invention can also optionally include a prediction unit for generating insights and predictions from the cleaned data according to the teachings of the present invention. FIG. 5 illustrates one embodiment of a prediction unit 90 for predicting user or customer interest in a product according to the teachings of the present invention. The data sources 12 can include non-financial data that is processed by the data preprocessing and enrichment unit 20 so as to clean and normalize the data. The non-financial data can include, for example, transaction related data, product related data, and user related data. The prediction unit 90 processes the input data and generates product recommendations and predictions based thereon. As used herein, the term "transaction related data" or "transaction data" is intended to include any selected type of data related or corresponding to the buying or selling of goods or services or related to business conducted between one or more enterprises. The transaction data can include, for example, user data, product data, geographic related information, date and time related data, purchase data including current and historical, and the like. As used herein, the term "product related data" or "product data" is intended to include any type of data identifying or related or corresponding to a product, such as an item, object or system available for use. The product data can include product identification information including product name, product type, quantity, product number, product description, unit of measure, cost and price, specifications, data sheets, image of product, and the like. Further, as used herein, the term "user related data" or "user data" is intended to include any types of data related or corresponding to a user or a collection of users, including, for example, content feature data, profile data, identification data such as name, address, city, state and the like, demographic data including age, gender, race, location, occupation, education, employment, marital status, income level, height, weight, behavior-derived type data including for example Life-Time Value (LTV) data, login persona data (e.g., daily, weekly, and monthly user type data), and the like.

The cleaned data 22 generated by the data preprocessing and enrichment unit 20 can include transaction data 92 that is processed by a filter unit 94 for filtering the transaction data to find patterns in the data and to generate an interest score having an interest score value associated therewith and indicative of a user's interest in a particular product or service. The filter unit 94 establishes relationships between products and users (e.g., customers) and then generates recommendations based on the transaction data. According to one embodiment, the filter unit 94 can include a pattern filter unit 96 for identifying one or more patterns in the transaction data. For example, the pattern filter unit 96 first identifies a set of users similar to a selected user having similar product preferences and then identifies or determines patterns of similarities between products that appear to be of interest between the users. The patterns can be related to, for example, the purchase of products by users that are similar to a selected user. The pattern filter unit 96 can generate a map or matrix of users to products and can then determine similar products that may be of interest to the selected user based on an affinity towards those products by other users that have interacted with those products. Based on this pattern of information, the pattern filter unit 96 can determine the likelihood that the selected user may purchase a selected product based on the selection preferences and interests of the similar users. Based on this information, the pattern filter unit 96 can recommend products to the selected user that may be of interest. According to one practice, the pattern filter unit can employ a collaborative filtering technique. In this regard, the pattern filter unit 96 can automatically make predictions (i.e., filtering) about the interests of the selected user by collecting preferences or taste information from many users having similar interests. The pattern filter unit 96 can then generate a first product interest score 98 having a selected value associated therewith that is indicative of an interest level in a selected product by the selected user. The first product interest score value can be any selected numerical designation, and is preferably a value having a range between 0 and 1.

The illustrated filter unit 94 can also include a neuro pattern filter unit 100 for also processing and filtering the transaction data 92 as well as user data 100. The user data 100 can include content feature data that includes, for example, profile and demographic data about the user. The neuro pattern filter unit 100 can process and filter the transaction data 92 and the user data 100 by representing the user-item relationship as a vector of latent features which are projected into a shared feature space using a non-linear representation. In this feature space, the user-item interactions can be modeled using the inner product of user-item latent vectors. Further, the neuro pattern filter unit 100 can model the user-item feature interaction through a neural network architecture so as to learn user-item interactions. As such, and similar to the pattern filter unit 96, the neuro pattern filter unit 100 can filter out items that a user may like based on the reactions of similar users, and can determine or find patterns in the data. Specifically, the neuro pattern filter unit 100 can initially identify a set of users similar to a selected user and then identify patterns of similarities between products that appear to be of interest between the users. The patterns can also be related to, for example, the purchase of products by users that are similar to a selected user. According to one practice, the neuro pattern filter unit 100 can employ a neuro collaborative filtering technique. In this regard, the neuro pattern filter unit 100 can automatically make predictions (i.e., filtering) about the interests of the selected user by collecting preferences or taste information from many users having similar interests. That is, the neuro pattern filter unit can identify from the transactional data and the user data a set of users having similar product preferences to the selected user. The neuro pattern filter unit 100 can then generate a second product interest score 102 having a selected value associated therewith that is indicative of a user interest level in a particular product. The second product interest score value can be any selected numerical designation, and is preferably a value having a range between 0 and 1.

The illustrated prediction unit 90 can also employ a page rank unit 106 for processing product data 104 and the user data 110 and then determining based thereon a community interest score in one or more products. As used herein, the term "community interest" is intended to mean an interest in an item, object or service that is common between multiple different users. Further, the term "community interest score" is intended to mean a value associated with or quantifying the community interest in the item, product or service. The page rank unit 106 operates by counting or determining the number and quality of web links directed to one or more web pages hosting or listing a selected product to determine an estimate of the importance of the product. The more links that are directed to the selected product, then the higher the importance value of the product. Thus, as more users (e.g., community) link to the product, the higher the importance of the product, and hence the higher an associated community interest score associated with the product. The page rank unit 106 thus generates a community interest score 108 associated with the product. The community interest score 108 can have a selected value associated therewith having a range between 0 and 1.

The prediction unit 90 can further include a user feature extraction unit 112 for processing user data 110, determining and identifying selected relevant or important user features or elements, and then generating a plurality of user feature scores or values 114 that can be weighted relative to each other. As used herein, the term "user feature" is intended to include specific relevant traits or attributes of a user or a set of users that can function as variables when employed in a machine learning technique. The user features can include, for example, demographic features such as age, gender, race, location, occupation, education, employment, marital status, income level, height, weight, and the like, as well as profile data features and identification features such as name, address, city, state and the like. The user feature extraction unit 112 can identify the important or primary relevant features in the user data 110 by applying a selection reduction technique, such as for example a principal component analysis technique, to reduce the dimensionality of the user data by identifying the primary features or principal components in a dataset defined by the user data. As used herein, the term "primary features" is intended to mean variables that are highly correlated with the identified target variable and typically do not correlate with each other. The user feature extraction unit 112 can then determine and identify the important or primary user features, and can then apply a weighting technique to the user features so as to weight the user features relative to each other. For example, the user features that are more important or applicable to a selected user can be assigned a higher weighted value. The user feature extraction unit 112 then generates a set of user features having associated scores or values 114 that are weighted relative to each other.

The prediction unit 90 can also include a product feature extraction unit 116 for processing the product data 104, determining and identifying selected important or primary product features or elements, and then generating a plurality of product feature scores or values 118 that can be weighted relative to each other. As used herein, the term "product feature" is intended to include specific relevant traits or attributes of a product that deliver value to a user and which can differentiate the product in the marketplace and provides a benefit or set of benefits to the user. The product features can function as variables when employed in a machine learning technique. The product features can include, for example, product type, product name, quantity, size, color, product number, product description, unit of measure, cost and price, product image, and the like. The product feature extraction unit 116 can identify the important or primary relevant features in the product data 104 by applying a selection reduction technique, such as for example a principal component analysis technique, to reduce the dimensionality of the product data by identifying the primary features or principal components in a dataset defined by the product data. The product feature extraction unit 116 can then determine and identify the important or primary product features, and can then apply a weighting technique to the product features so as to weight the features relative to each other. For example, the product features that are more important or applicable to a selected user can be assigned a higher weighted value. The product feature extraction unit 116 then generates a set of product features having associated scores or values 118 that are weighted relative to each other.

The first product interest score 98 and associated value, the second product interest score 102 and associated value, the community interest score 108 and associated value, the user feature score 114 and associated value, and the product feature score 118 and associated value can be conveyed or transferred to a scoring unit 120 for processing the scores or values. In particular, the scoring unit can determine a final product interest score 122 based on the scores and values provided as inputs. The final product interest score 122 generated by the scoring unit 120 and any associated value can be an average of the input scores, a median of the input scores, the best or highest input score received by the scoring unit 120, or by some other meaningful numerical combination input scores. The scoring unit 120 can employ a neural network technique for processing and managing the input score values, and preferably can employ a feed forward neural network. The final product interest score 122 can have a value associated therewith between the range of 0 and 1. The final product interest score 122 can be conveyed to a ranking unit 124 for selecting and ranking the final product interest scores associated with a number of different products. The ranking unit can rank the scores in any selected manner or fashion, and preferably ranks the scores from highest to lowest scores. The ranking unit 124 can then generate rank data 126 indicative of the product rankings. The ranking unit 124 also allows for additional business consideration to be incorporated with rankings output from the machine learning unit to prepare a final set of recommendations. For example, the scoring unit 120 can output the top best recommendations for a customer as a series of products. If the scoring unit is preset to provide the top five recommendations, then the product series can include product 1, product 2, product 3, product 4, and product 5. The ranking unit 124, however, may incorporate a business preference to sell more of a selected product (e.g., product 4), and change the product ranking to reflect this business preference as, for example, product 1, product 4, product 2, product 3, product 5. Business considerations may also prioritize related products in a group in the ranking. For example, the scoring unit 120 may output product 1a, product 2a, product 1b, product 3, product 2b. But the ranking unit 124 prioritizes related products and changes the ranking to product 1a, product 1b, product 2a, product 2b, and product 3. The ranking data thus serves as predictions regarding the products and product features that the user have interest. The rank data forms part of the machine language data that can be stored in the data storage unit 18. This collection of units allows for a flexible approach which can begin to work when a client has a minimal amount of data, and becomes more sophisticated as more data becomes available.

Figure 6:
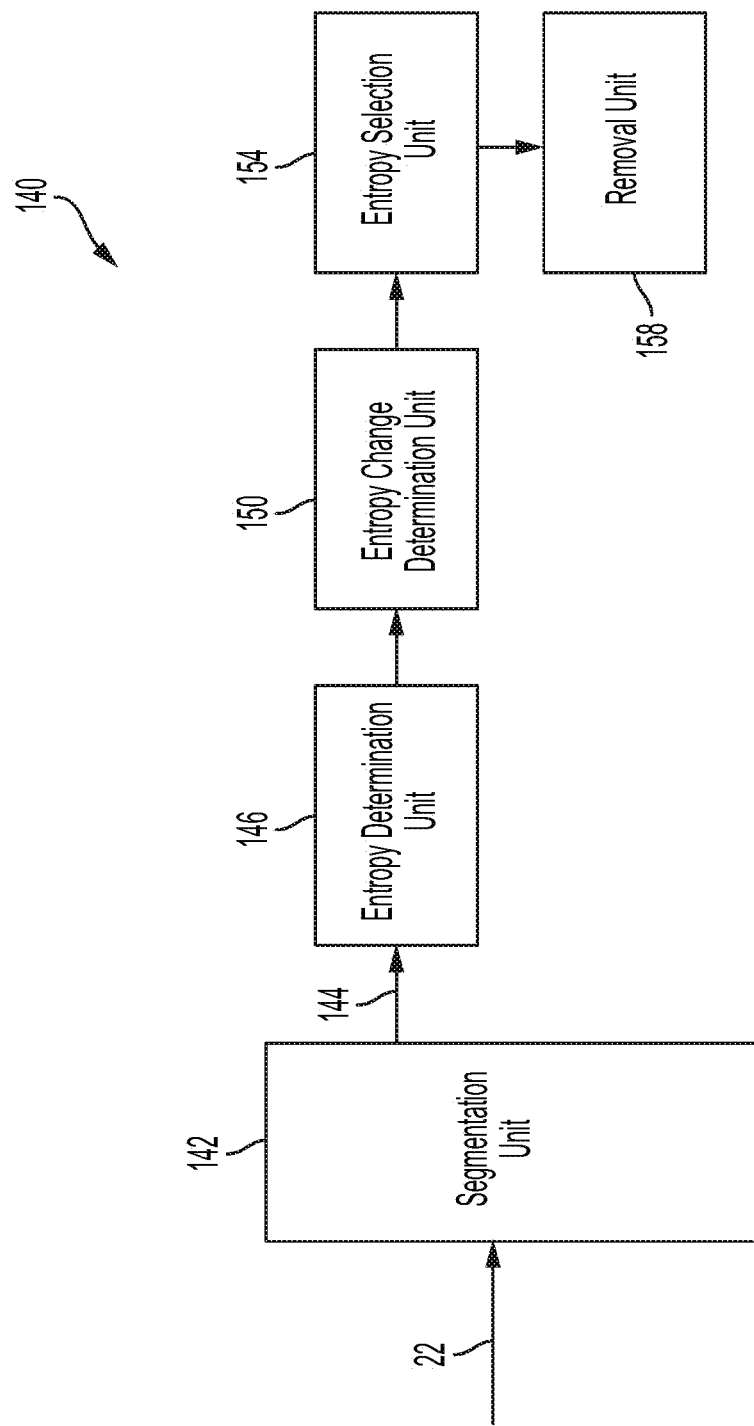
FIG. 6 is a schematic block diagram showing the elements of an anomaly detection unit that forms part of the data aggregation and normalization system according to the teachings of the present invention.
Figure 7:
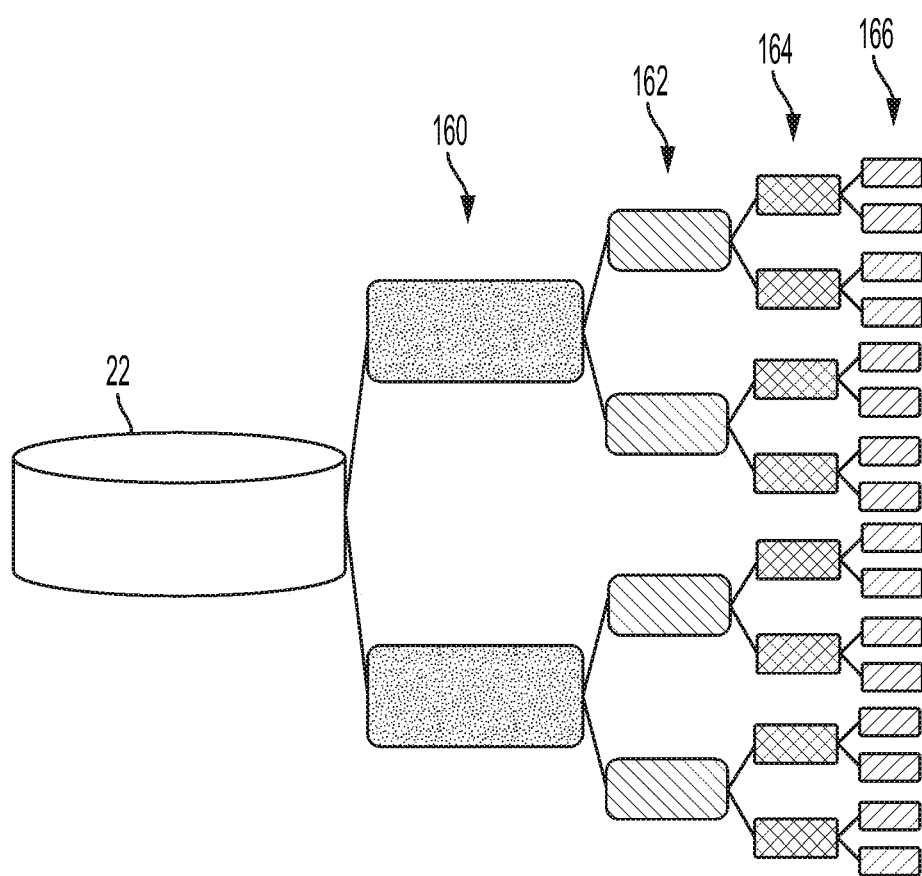
FIG. 7 is a schematic representation of segmented data that is segmented by a segmentation unit that forms part of the anomaly detection unit according to the teachings of the present invention.
Figure 8:
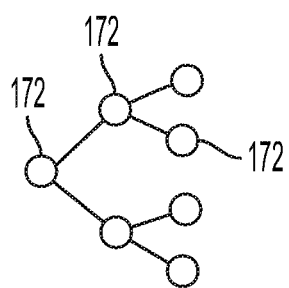
FIG. 8 is a schematic representation of a decision tree that represents segmented data according to the teachings of the present invention.

As illustrated in FIG. 6, the machine language module 30 of the present invention can also include an optional anomaly detection unit 140 for identifying and detecting anomalies in selected portions of the cleaned data 22. As used herein, the term "anomalies" and "anomaly" is intended to mean the detection of data, items, events or observations that do not conform to and differ significantly from an expected outcome or pattern or from other items in a dataset, locally or globally, that are usually undetectable by a system or by a human subject matter expert. The detection of anomalies can be applicable in a variety of domains, such as, for illustrative purposes only, intrusion detection, financial fraud detection, fault detection, system health monitoring, event detection in sensor networks, defect detection in images using machine vision, system inefficiencies, and the like. The anomaly detection unit 140 can include a segmentation unit 142 for segmenting the cleaned data, presented in the form of a dataset, into a plurality or series of data segments. The segmentation unit 142 can segment or group together the cleaned data into two or more subsets, which can in turn be further segmented as needed. The data can be segmented according to one or more data attributes, date type, use cases, and the like. The data attribute can be any selected data descriptor (e.g., so as to represent categorical variables) that describes other data. The data 22 can be segmented into a series of combinations of the data based on the selected variables and attributes. An illustrative example of the data segmentation process performed by the segmentation unit 142 is shown for example in FIG. 7. The illustrated cleaned data 22 can be segmented for example into macro segments 160, which can be further segmented or divided into multiple additional groups or tiers of segments 162, 164, 166. The data segments can be arranged in any selected pattern or manner, and are preferably arranged in a hierarchical manner. The data segments can also be represented in a decision tree or process flow format 170 as a series of nodes 172, representing the subpopulations, and corresponding edges 174, which represent a logical statement distinguishing the subpopulations, as shown for example in FIG. 8. The data segments are represented as the nodes 172 in the tree 170.

Figure 9A:
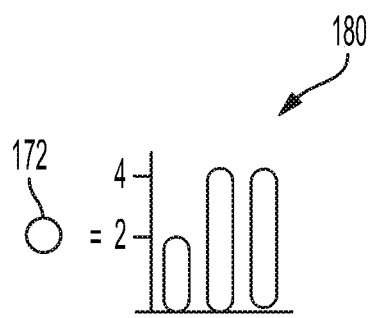
FIG. 9A is a graphical representation of a distribution of sub-population values generated by the anomaly detection unit according to the teachings of the present invention.

The anomaly detection unit 140 also includes an entropy determination unit 146 for determining the entropy of each of the segmented data 144 associated with the data segments 160, 162, 164, and 166. As used herein, "entropy" is intended to mean a measure of the amount of disorder or surprise in a system, data, data segment, and the like. The entropy of the data can be measured and quantified according to known techniques, and can be calculated into an entropy value that typically ranges between 0 and 1 or higher, where the higher the number corresponds to a higher amount of disorder in the data or system. The entropy values can be collated to form a distribution of entropy values. For example, as shown in FIG. 9A, each of the data segments or tiers of data segments (e.g., sub-populations) can be represented as a node 172 in the decision tree, and an entropy value can be calculated for the subpopulation distribution 180 indicating its level of surprise or disorder. As such, the entropy value is a statistic of the sub-population. The sub-population distribution can be represented as a graph having the number of members along the Y-axis and distribution bins represented along the X-axis. A relatively flat distribution is indicative of the outcome as being relatively equal and the surprise or amount of disorder is maximized since all possible outcomes are present. Further, in the edge between two sub-population distributions 180, the differences in entropy values between data segments is indicative of a selected amount or degree of disorder or surprise.

Figure 9B:
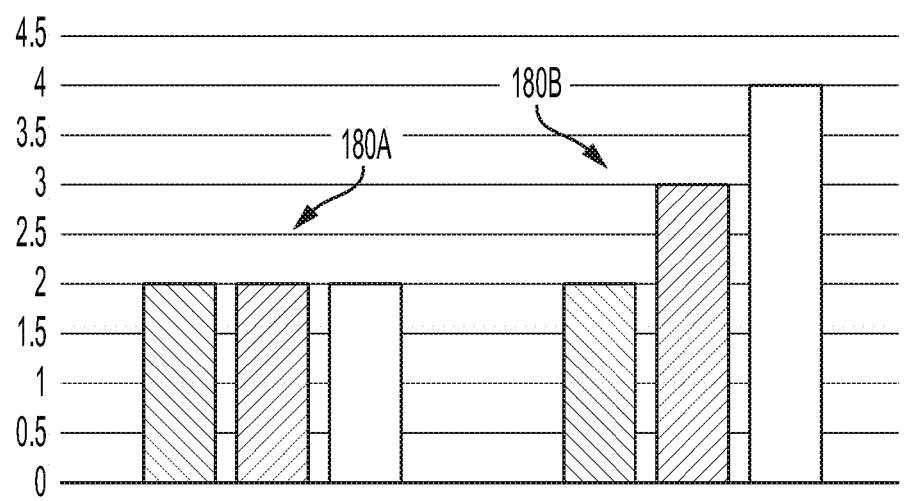
FIG. 9B is a graphical representation of a distribution of entropy change values generated by the anomaly detection unit according to the teachings of the present invention.

The anomaly detection unit 140 can also include an entropy change determination unit 150 for determining a change in entropy of each of the data segments or sub-populations of data segments relative to each. The difference or change in entropy can be represented as an entropy change value that is indicative of or a measure of the change in disorder or surprise between the data segments. The entropy change values can correspond to the edges 174 in the decision tree 170. The change in entropy can be determined or calculated by using a Kullback-Leibler (K-L) divergence technique. The entropy change value is a measure of a difference between two random data segments or sub-populations of data segments. The entropy change values can be organized so as to identify a distribution of entropy change values across the data segments or sub-populations of data segments. According to one practice, the entropy change values can be calculated or determined between respective entropy distributions. For example, as shown in FIG. 9B, the changes in entropy values associated with the constituent portions of a first distribution of data segments or sub-populations 180A is compared with the changes in entropy values associated with the constituent portions of a second distribution of data segments or sub-populations 180B. If the entropy distributions that are compared with each other are the same, then the change in entropy values is zero. In the illustrated example, the second entropy distribution 180B is different from the first entropy distribution, and hence when compared with each other the unit 150 determines that there is a selected measure of entropy change that exists in the system. The entropy change value enables the anomaly detection unit 140 to identify potential anomalies in the data segments.

Figure 9C:
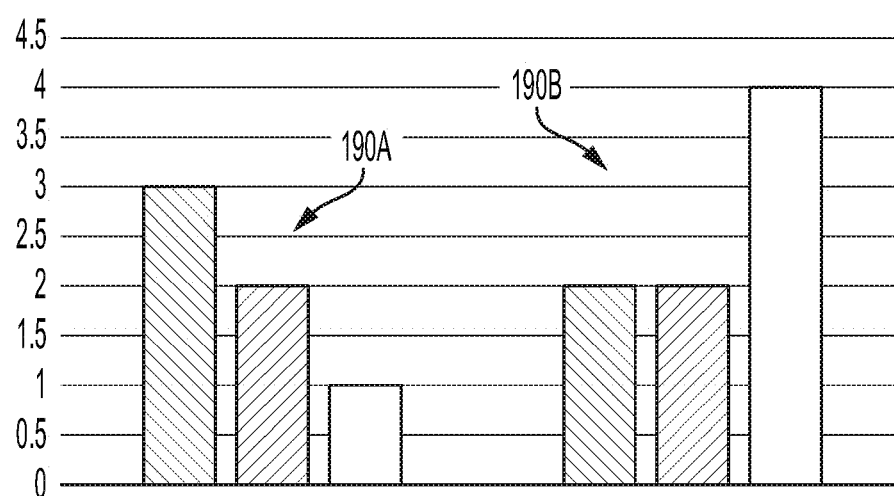
FIG. 9C is a graphical representation of multiple different distributions of entropy change values generated by the anomaly detection unit according to the teachings of the present invention.

The illustrated anomaly detection unit 140 can further include an entropy selection unit 154 for analyzing the distribution of entropy change values generated by the entropy change determination unit 150 and then selecting the entropy change values from among the distributed entropy change values that have the greatest impact on the mean value of the entropy change values. Entropy is a technique that captures various changes in distributions. From a business perspective, only the changes that move the mean up or down are likely to be material from a business perspective. As such, the anomaly detection unit 140 can select instances of an entropy change and also where the change or difference is significant, since it moves the distribution in the correct direction. Specifically, the entropy selection unit 154 identifies and selects the distributions of entropy change values that trend in an upward direction and hence add to or increase the overall mean cost. Alternatively, the entropy selection unit 154 can identify and select the entropy change values that trend in a downward direction. From the selected values, the entropy selection unit 154 can identify or select the relevant data segments from a business perspective. For example, as shown for example in FIG. 9C, the illustrated chart shows a first distribution of entropy change values 190A and a second distribution of entropy change values 190B. The first distribution 190A has a declining or negative entropy change value and the second distribution 190B has an increasing or positive entropy change value. As such, the second distribution can be identified and selected by the entropy selection unit 154 since it has a positive or greater impact on the mean entropy values.

Figure 9D:
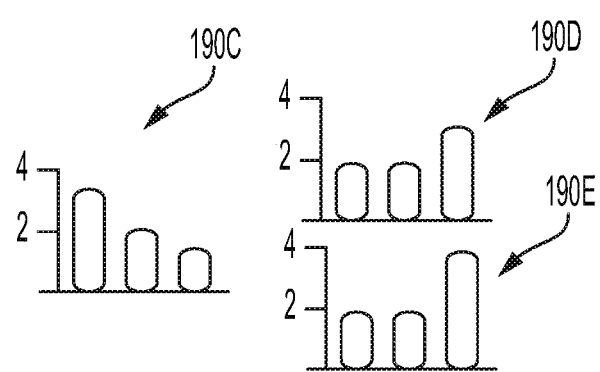
FIG. 9D is a graphical representation of a selection of similar sub-population distributions being clustered together according to the teachings of the present invention.

The anomaly detection unit 140 still further includes a removal unit 158 for identifying and clustering together entropy change values that have similar entropy change value distributions. For example, as shown in FIG. 9D, sample distributions of entropy change values 190C, 190D and 190E are illustrated. The distribution of entropy change values 190C is different than the distributions 190D and 190E. Further, the distributions 190D and 190E are the same. As such, the removal unit 158 can identify the distributions 190D and 190D, and since they are the same, perform a clustering technique and cluster together the distributions 190D and 190E. The similarity of the distributions of the entropy change values can correspond to data segments that have an identical anomaly associated therewith. Oftentimes, the similarity corresponds to a parent-child hierarchical arrangement of data segments that are highly similar and represent the same underlying anomaly. When this occurs, the entropy selection unit 154 can select one of the entropy value distributions as a representative distribution and remove the identical distributions. For example, the removal unit 158 can select either distribution 190D or 190E as a representative distribution and remove the non-selected distribution. The remaining distributions of entropy change values correspond to anomalies that exist in the data segments. The removal unit 158 thus enables the removal of redundant information, such as distributions of entropy change values, so that the system can process the data with fidelity and with a high degree of accuracy. The entropy change values can be forwarded to the reporting unit 50 and then inserted into any suitable visualization software for review by the user.

The anomaly detection unit 140, being a combination of the segmentation unit 142, the entropy detection unit 146, entropy change determination unit 150, entropy selection unit 154, and the removal unit 158, has a specific advantage of being a systematic protocol for identifying unambiguous sub-population anomalies in a dataset in a comprehensive and unbiased way. The segmentation unit 142 can identify all possible subpopulations. The entropy determination and change units utilize a sensitive information statistic to identify a wide variety of differences in sub-populations, which captures a wide range of potential anomalies, and then the entropy selection and removal units refine this range of sub-population differences to identify unambiguous local and global anomalies that are potentially material to the objectives of the business.

Efficiency can be gained through changes to the configuration of the segmentation, entropy selection, and removal units. The segmentation unit 142 can be configured through directed hierarchical searches of sub-populations to follow a particular business objective. Less permissive selection criteria in the entropy selection and removal units can restrict the analysis to more significant or material anomalies. For example, the initial analysis of complex supply chain data, and a broad, unbiased selection of all sub-populations in the data would be desirable to identity anomalies and potential business objectives. A follow-up analysis can then attempt a more specific search by configuring an ordered search hierarchy in the segmentation unit and less-permissive configurations in the entropy selection and removal units. For example, a broad analysis of the supply chain data can determine that some combination of day-of-week shipped and destination US states have anomalous high shipping costs. A follow-up analysis hierarchically segmenting first by day-of-week and then by US states with less-permissive selection thresholds can isolate the underlying cause of the anomalous shipping costs. Systematically identifying underlying cost anomalies allows an organization to adapt its supply chain operations to better service its business goals.

It is to be understood that although the invention has been described above in terms of particular embodiments, the foregoing embodiments are provided as being illustrative only, and are not intended to limit or define the scope of the invention. Various other embodiments, including but not limited to those described herein are also within the scope of the claims and current invention. For example, the foregoing elements, units, modules, tools and components described herein may be further divided into additional components or sub-components or joined together to form fewer components for performing the same functions.

Any of the functions disclosed herein may be implemented using means for performing those functions. Such means include, but are not limited to, any of the components or units disclosed herein, as well as known electronic and computing devices and associated components.

The techniques described herein may be implemented, for example, in hardware, one or more computer programs tangibly stored on one or more computer-readable media, firmware, hardware or any combination thereof. The techniques described herein may be implemented in one or more computer programs executing on (or executable by) a programmable computer or electronic device having any combination of any number of the following: a processor, a storage medium readable and/or writable by the processor (including, for example, volatile and non-volatile memory and/or storage elements), an input device, an output device, and a display. Program code may be applied to input entered using the input device to perform the functions described and to generate output using the output device.

The term computing device or electronic device as used herein can refer to any device, such as a computer, smart phone, server and the like, that includes a processor and a computer-readable memory capable of storing computer-readable instructions, and in which the processor is capable of executing the computer-readable instructions in the memory. The terms electronic device, computer system and computing system refer herein to a system containing one or more computing devices that are configured to implement one of more units, modules, or components of the data aggregation and normalization system 10 of the present invention.

Embodiments of the present invention include features which are only possible and/or feasible to implement with the use of one or more computers or servers, processors, and/or other elements of a computer or server system. Such features are either impossible or impractical to implement mentally and/or manually. For example, embodiments of the present invention may operate on digital electronic processes which can only be created, stored, modified, processed, and transmitted by computing devices and other electronic devices. Such embodiments, therefore, address problems which are inherently computer-related and solve such problems using computer technology in ways which cannot be solved manually or mentally by humans.

Any claims herein which by implication or affirmatively require an electronic device such as a computer or server, a processor, a memory, storage, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited electronic device or computer-related element(s). Such a method claim should not be interpreted, for example, to encompass a method that is performed mentally or by hand (e.g., using pencil and paper). Similarly, any product or computer readable medium claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

Embodiments of the present invention solve one or more problems that are inherently rooted in computer technology. For example, embodiments of the present invention solve the problem of how to determine the lineage of business terms and application interfaces between multiple software applications. There is no analog to this problem in the non-computer environment, nor is there an analog to the solutions disclosed herein in the non-computer environment.

Furthermore, embodiments of the present invention represent improvements to computer and communication technology itself. For example, the system 10 of the present can optionally employ a specially programmed or special purpose computer in an improved computer system, which may, for example, be implemented within a single computing device.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive (read) programs and data from, and write (store) programs and data to, a non-transitory computer-readable storage medium such as an internal disk (not shown) or a removable disk. These elements can also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium. Embodiments of the invention may store such data in such data structure(s) and read such data from such data structure(s).

It should be appreciated that various concepts, systems and methods described above can be implemented in any number of ways, as the disclosed concepts are not limited to any particular manner of implementation or system configuration. Examples of specific implementations and applications are discussed herein are primarily for illustrative purposes and for providing or describing the operating environment of the system of the present invention. The data aggregation and normalization system 10 and/or elements or units thereof can employ one or more electronic or computing devices, such as one or more servers, clients, computers, laptops, smartphones and the like, that are networked together or which are arranged so as to effectively communicate with each other. The network can be any type or form of network. The devices can be on the same network or on different networks. In some embodiments, the network system may include multiple, logically-grouped servers. In one of these embodiments, the logical group of servers may be referred to as a server farm or a machine farm. In another of these embodiments, the servers may be geographically dispersed. The electronic devices can communicate through wired connections or through wireless connections. The clients can also be generally referred to as local machines, clients, client nodes, client machines, client computers, client devices, endpoints, or endpoint nodes. The servers can also be referred to herein as servers, server nodes, or server machines. In some embodiments, a client has the capacity to function as both a client or client node seeking access to resources provided by a server or server node and as a server providing access to hosted resources for other clients. The clients can be any suitable electronic or computing device, including for example, a computer, a server, a smartphone, a smart electronic pad, a portable computer, and the like. The system 10 or any associated units or components of the system can employ one or more of the illustrated computing devices and can form a computing system. Further, the server may be a file server, application server, web server, proxy server, appliance, network appliance, gateway, gateway server, virtualization server, deployment server, SSL VPN server, or firewall, or any other suitable electronic or computing device, such as the electronic device 300. In one embodiment, the server may be referred to as a remote machine or a node. In another embodiment, a plurality of nodes may be in the path between any two communicating servers or clients.

The invention claimed is:

1. A data aggregation and normalization system for enriching and normalizing data, comprising
   a plurality of data sources for providing data that is generated by a plurality of different types of data systems that are managed by different types of software applications,
   a data extraction unit for extracting selected portions of the data from the plurality of data sources to form extracted data,
   a data storage unit for storing the extracted data,
   a data preprocessing and enrichment unit for processing and enriching the extracted data to form cleaned data that is stored in the data storage unit, wherein the data preprocessing and enrichment unit includes
      a data cleaning unit for cleaning the extracted unit to form cleaned data,
      a common data model unit for inserting the cleaned data into a common data model to normalize the cleaned data, and
      an assessment unit for assessing a quality of the cleaned data in the common data model,
   a machine language module having a plurality of pre-defined machine learning units for applying one or more selected artificial intelligence and machine learning (AI/ML) techniques to selected portions of the cleaned data to form machine language data,
   a transformation unit for transforming the machine language data into a selected reporting format, and
   a reporting unit for generating one or more reports from the data in the reporting format,
   wherein the cleaned data includes transaction data, product data, and user data, wherein the machine language module further comprises a prediction unit for processing the transaction data and the user data and generating a prediction based on an interest in one or more selected products of a selected user, wherein the prediction unit includes
      a filter unit for processing the transaction data and the user data and for generating a product interest score indicative of the interest in the one or more selected products by the selected user, wherein the filter unit includes a pattern filter unit for identifying from the transactional data a set of users having similar product preferences to the selected user and for generating based thereon a first product interest score indicative of a first interest level in the product by the selected user, and a neuro pattern filter unit for identifying from the transactional data and the user data a set of users having similar product preferences to the selected user and for generating based thereon a second product interest score indicative of a second interest level in the product by the selected user, a page rank unit for processing the product data and the user data and for generating therefrom a community interest score associated with the one or more selected products, a user feature extraction unit for processing the user data and for identifying and extracting one or more primary user features based on the user data having a user feature score associated therewith, a product feature extraction unit for processing the product data and for identifying and extracting one or more primary product features based on the product data having a product feature score associated therewith, a scoring unit for receiving and processing the first product interest score, the second product interest score, the community interest score, the user feature score, and the product feature score to determine therefrom a final product score indicative of the user interest in the one or more selected products, and a ranking unit for ranking the final product interest scores.

2. The system of claim 1, wherein the data extraction unit is configured to copy the data from the data sources, transform the copied data by converting the data into a selected format, and load the data in the data storage unit.

3. The system of claim 1, further comprising a data feedback loop for reintroducing to one or more of the plurality of data sources the transformed data for subsequent processing by the data preprocessing and enrichment unit.

4. The system of claim 1, wherein the community interest score generated by the page rank unit is based on a number of web links directed to one or more web pages listing the one or more selected products.

5. The system of claim 4, wherein the user feature extraction unit employs a principal component analysis technique to determine the one or more primary user features.

6. The system of claim 5, wherein the product feature extraction unit employs a principal component analysis technique to determine the one or more primary product features.

7. The system of claim 1, wherein the machine language module further comprises an anomaly detection unit for detecting one or more anomalies in the cleaned data, wherein the anomaly detection unit includes a segmentation unit for segmenting the cleaned data into a plurality of data segments, an entropy determination unit for determining entropy values for each of the plurality of data segments and for determining a plurality of distributions of the entropy values, an entropy change determination unit for comparing each of the plurality of distributions of the entropy values with each of the remaining ones of the plurality of distributions of the entropy values and for determining therefrom a change in the entropy value of each of the plurality of data segments relative to each other to form a plurality of distributions of entropy change values, an entropy selection unit for analyzing and selecting one or more distributions of entropy change values that trend in an upward direction, wherein the entropy change values correspond to one or more anomalies, and a removal unit for identifying selected ones of the plurality of distributions of entropy change values that are identical to each other, clustering together the identical ones of the plurality of distributions of entropy change values, and then removing duplicates of the identical ones of the plurality of distributions of entropy change values.

8. The system of claim 7, wherein the segmented data is arranged in a hierarchical manner.

9. The system of claim 8, wherein the change in the entropy value can be determined by employing a K-L divergence technique.

10. The system of claim 1, wherein the data preprocessing and enrichment unit further comprises a data lineage unit for determining a lineage of selected portions of the cleaned data.

11. The system of claim 10, wherein the data lineage unit applies a plurality of business rules to the cleaned data.

12. A method for enriching and normalizing data from a plurality of different types of data systems that are managed by different types of software applications, comprising extracting with a data extraction unit selected portions of data from a plurality of data sources to form extracted data, wherein the plurality of data sources provides data that is generated by a plurality of different types of data systems that are managed by different types of software applications, storing the extracted data in a data storage unit, processing and enriching the extracted data with a data preprocessing and enrichment unit to form cleaned data that is stored in the data storage unit, wherein the processing and enriching of the cleaned data includes cleaning the extracted unit with a data cleaning unit to form cleaned data, inserting the cleaned data into a common data model to normalize the cleaned data, assessing a quality of the cleaned data in the common data model, and determining with a data lineage unit a lineage of selected portions of the cleaned data, applying one or more selected artificial intelligence and machine learning (AI/ML) techniques to selected portions of the cleaned data to form machine language data, wherein the one or more selected artificial intelligence and machine learning (AI/ML) techniques is stored in a machine language module having a plurality of predefined machine learning units, transforming the machine language data into a selected reporting format, and generating with a reporting unit one or more reports from the data in the reporting format, wherein the cleaned data includes transaction data, product data, and user data, and wherein the machine language module further includes a prediction unit for processing the transaction data and the user data and generating a prediction based on an interest in one or more selected products of a selected user, wherein the prediction unit is configured for:
- filtering with a filter unit the transaction data and the user data and generating a product interest score indicative of the interest in the one or more selected products by the selected user, wherein the filter unit is configured for:
  - identifying from the transactional data a set of users having similar product preferences to the selected user and generating based thereon a first product interest score indicative of a first interest level in the product by the selected user with a pattern filter unit, and
  - identifying from the transactional data and the user data a set of users having similar product preferences to the selected user and generating based thereon a second product interest score indicative of a second interest level in the product by the selected user with a neuro pattern filter unit,
- processing with a page rank unit the product data and the user data and generating therefrom a community interest score associated with the one or more selected products,
- processing with a user feature extraction unit the user data and identifying and extracting one or more primary user features based on the user data having a user feature score associated therewith,
- processing with a product feature extraction unit the product data and identifying and extracting one or more primary product features based on the product data having a product feature score associated therewith,
- processing with a scoring unit the first product interest score, the second product interest score, the community interest score, the user feature score, and the product feature score to determine therefrom a final product score indicative of the user interest in the one or more selected products, and
- ranking the final product interest scores.

13. The method of claim 12, wherein the data extraction unit is configured to copy the data from the data sources, transform the copied data by converting the data into a selected format, and loading the data in the data storage unit.

14. The method of claim 12, further comprising reintroducing to one or more of the plurality of data sources the transformed data for subsequent processing by the data preprocessing and enrichment unit with a data feedback loop.

15. The method of claim 12, wherein the community interest score generated by the page rank unit is based on a number of web links directed to one or more web pages listing the one or more selected products.

16. The method of claim 15, wherein the user feature extraction unit employs a principal component analysis technique to determine the one or more primary user features.

17. The method of claim 16, wherein the product feature extraction unit employs a principal component analysis technique to determine the one or more primary product features.

18. The method of claim 12, wherein the machine language module further comprises an anomaly detection unit for detecting one or more anomalies in the cleaned data, wherein the anomaly detection unit is configured for:
- segmenting the cleaned data into a plurality of data segments,
- determining with an entropy determination unit entropy values for each of the plurality of data segments and for determining a plurality of distributions of the entropy values,
- comparing with an entropy change determination unit each of the plurality of distributions of the entropy values with each of the remaining ones of the plurality of distributions of the entropy values and determining therefrom a change in the entropy value of each of the plurality of data segments relative to each other to form a plurality of distributions of entropy change values,
- selecting with an entropy selection unit one or more distributions of entropy change values that trend in an upward direction, wherein the entropy change values correspond to one or more anomalies, and
- identifying selected ones of the plurality of distributions of entropy change values that are identical to each other, clustering together the identical ones of the plurality of distributions of entropy change values, and then removing duplicates of the identical ones of the plurality of distributions of entropy change values.

19. The method of claim 18, wherein the segmented data is arranged in a hierarchical manner.

20. The method of claim 19, wherein the change in the entropy value can be determined by employing a K-L divergence technique.

21. The method of claim 12, further comprising determining with a data lineage unit a lineage of selected portions of the cleaned data.

22. The method of claim 21, wherein the step of determining the data lineage further applies a plurality of business rules to the cleaned data.

* * * * *